United States Patent
Beck et al.

(10) Patent No.: US 6,640,463 B1
(45) Date of Patent: Nov. 4, 2003

(54) VEHICLE AIR SUPPLY SYSTEMS

(75) Inventors: Andrew Howard Beck, Birkby (GB); David Townsend, West Ardely Wakefield (GB)

(73) Assignee: Wabco Automotive UK Limited (GB)

( * ) Notice: Subject to any disclaimer, the term of this patent is extended or adjusted under 35 U.S.C. 154(b) by 0 days.

(21) Appl. No.: 10/069,937

(22) PCT Filed: Sep. 4, 2000

(86) PCT No.: PCT/GB00/03381

§ 371 (c)(1),
(2), (4) Date: Jul. 1, 2002

(87) PCT Pub. No.: WO01/17834

PCT Pub. Date: Mar. 15, 2001

(30) Foreign Application Priority Data

Sep. 3, 1999 (GB) .............................................. 9920694

(51) Int. Cl.$^7$ .............................................. F26B 21/06
(52) U.S. Cl. .............................. 34/527; 34/538; 34/558; 34/80
(58) Field of Search ...................... 96/113, 141; 303/1, 303/85, 59, 60, 61; 34/527, 538, 558, 80

(56) References Cited

U.S. PATENT DOCUMENTS

| | | | | |
|---|---|---|---|---|
| 3,778,967 A | * | 12/1973 | Kauer et al. ................. | 55/21 |
| 4,168,149 A | * | 9/1979 | Armond et al. ............... | 55/21 |
| 4,549,888 A | * | 10/1985 | Fannin ........................ | 55/163 |
| 4,714,483 A | * | 12/1987 | Koenig et al. ................ | 55/163 |
| 4,892,569 A | * | 1/1990 | Kojima ....................... | 55/163 |
| 4,936,026 A | * | 6/1990 | Cramer et al. ................ | 34/53 |
| 5,027,529 A | * | 7/1991 | Cramer et al. ................ | 34/53 |
| 5,209,764 A | * | 5/1993 | Eberling ..................... | 55/162 |
| 5,458,676 A | * | 10/1995 | Herbst et al. ................ | 96/109 |
| 5,575,541 A | * | 11/1996 | Elamin ....................... | 303/1 |
| 5,592,754 A | * | 1/1997 | Krieder et al. ............... | 34/527 |
| 5,917,139 A | * | 6/1999 | Goodell et al. ............... | 96/113 |
| 6,050,651 A | * | 4/2000 | Thomas ....................... | 303/86 |
| 6,074,462 A | * | 6/2000 | Quinn et al. ................. | 96/113 |
| 6,120,107 A | * | 9/2000 | Eslinger ..................... | 303/1 |
| 6,391,098 B1 | * | 5/2002 | Thomas ....................... | 96/111 |

FOREIGN PATENT DOCUMENTS

| | | | | |
|---|---|---|---|---|
| GB | 2216823 A | * | 10/1989 | ........ B01D/53/26 |
| JP | WO 91/16225 | | 1/1991 | |

* cited by examiner

*Primary Examiner*—Ira S. Lazarus
*Assistant Examiner*—K. B. Rinehart
(74) *Attorney, Agent, or Firm*—Nixon Peabody LLP; Jeffrey L. Costellia

(57) ABSTRACT

A vehicle air supply system having a compressor, an air dryer, a reservoir adapted to receive air from the compressor via the air dryer, and control means operable to cause a standard regeneration of the air dryer when a predetermined system condition is met, the control means being further operable to cause an intermediate regeneration of the air dryer in advance of said predetermined system condition being met.

20 Claims, 2 Drawing Sheets

VEHICLE AIR SUPPLY SYSTEMS

Figure 1:
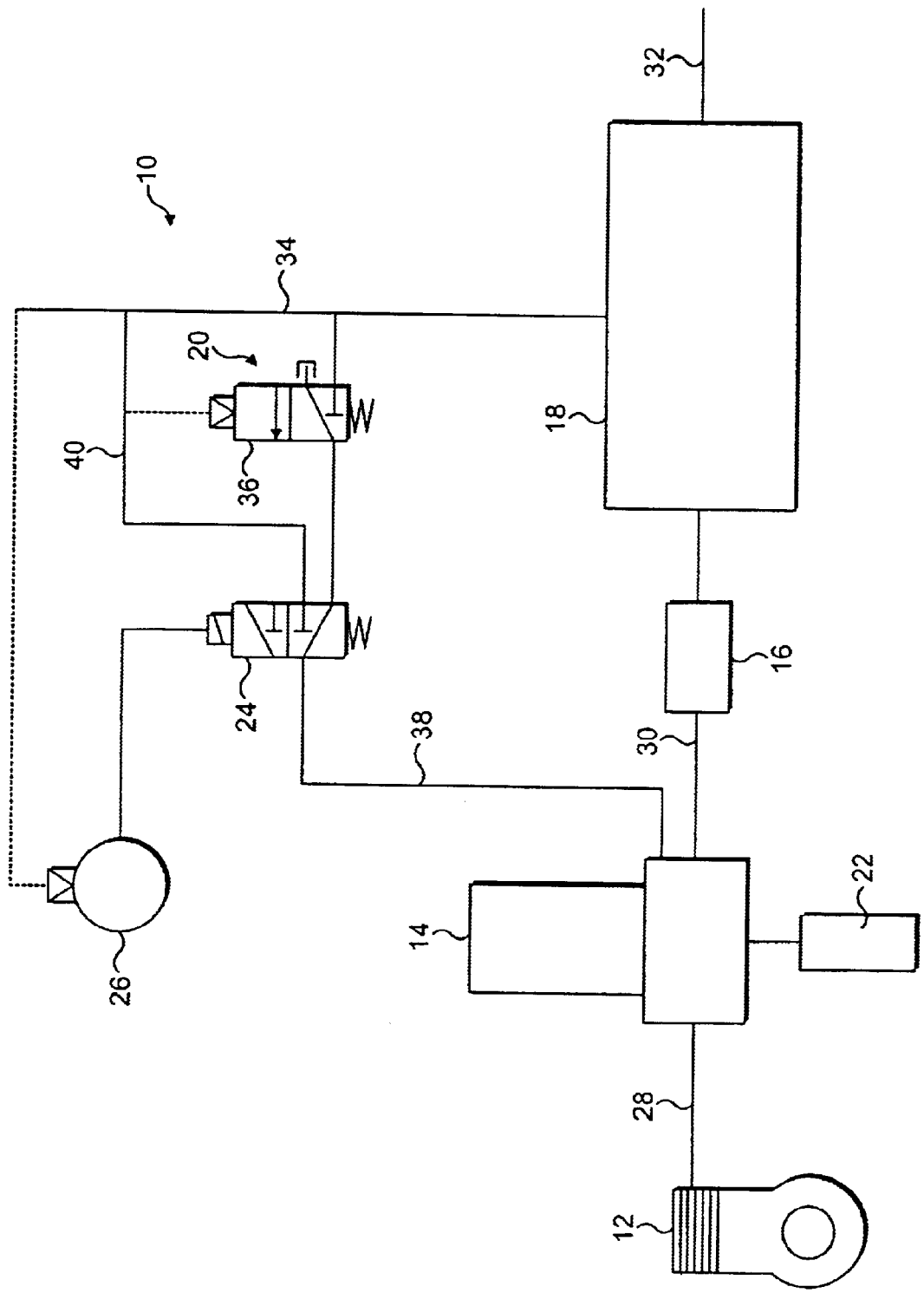

This invention relates to a vehicle air supply system and particularly to a system adaptable to occasionally supply large volumes of air at relatively low pressure for, for example, tyre inflation purposes.

A typical air supply system includes a compressor, a reservoir for pressurised air, and a drive operated demand valve to forward air from the reservoir for a desired purpose, for example to operate and maintain a braking system or pneumatic suspension system. The air supply system usually includes a dryer for compressor outlet air, and control means to take the compressor off load and regenerate the air dryer when the reservoir is at maximum pressure and the demand valve is closed. The compressor is typically taken off load by spragging a valve or by venting the compressor cylinder to atmosphere so that the compressor free wheels. Alternatively the compressor may include a clutch engageable with the compressor drive source, usually the vehicle engine. The air dryer is regenerated by passing a volume of dry air through the desiccant in reverse, and is typically triggered as the reservoir reaches maximum pressure, and regardless of the volume of air which has been dried.

In addition to the air being used e.g. for pneumatic suspension, the system may occasionally be required to forward relatively large volumes of air, i.e. volumes greater than the volume of the reservoir, at low pressure for, for example, tyre inflation. Typically the pressure of air required for tyre inflation will not exceed 2.5 bar. In such a situation the compressor is required to operate for longer than is normally required to fill the reservoir, and there exists the possibility that during this extended operation of the compressor the desiccant in the air dryer may become saturated especially if the air dryer is regenerated only at times when the reservoir reaches the maximum design pressure.

If however the air dryer is designed to cope with occasional demands for a large volume of air, the volume of desiccant will be very large, and the majority will be unused for most of the time. What is required is a solution which can accommodate occasional large volumes of air without enlarging the desiccant volume.

According to a first aspect the present invention there is provided an air supply system having a compressor, an air dryer, a reservoir adapted to receive air from the compressor via the air dryer, and control means operable to take the compressor off-load and regenerate the air dryer when a predetermined system condition is met, the control means being further operable to take the compressor off-load and regenerate the air dryer independently of said predetermined system condition being met.

In a preferred embodiment the additional control means are operable, to take the compressor off-load and to regenerate the air dryer in advance of said predetermined condition being met.

The control means is operable so as to prevent saturation of the air dryer desiccant in circumstances where the compressor is on load for an extended period of time, and thus likely to be pumping a large volume.

In a preferred embodiment the predetermined system condition is a reservoir pressure and a governor is adapted to operate when the reservoir reaches a target pressure. In such an embodiment the governor sends an off load/purge signal to the compressor and air dryer when the target pressure is reached. The signal may be a pressure signal. Preferably the pressure signal is communicated via a pressure line from the reservoir. The governor may, in a preferred embodiment, include a pressure sensitive valve in said pressure line.

The control means may be adapted to bypass the governor and send an off load/purge signal to the compressor and air dryer. In the case where signal is a pressure signal, the control means may include a bypass line for the governor, a valve positioned in said bypass line and a timer adapted to open said valve. The valve may be solenoid operated. The timer is thus adapted to open said valve and thereby send an off-load purge signal after a predetermined time period has elapsed. Preferably the timer is activated and suspended response to a predetermined system condition. The timer may be responsive to, for example, reservoir pressure or the operating condition of the compressor. The timer is preferably reset after each regeneration.

According to a second aspect of the present invention there is provided a vehicle air supply system having a compressor, an air dryer, a first reservoir adapted to receive air from the compressor via the air dryer, a second reservoir adapted to receive air from the first reservoir, and control means operable to cause a standard regeneration of the air dryer when a predetermined system condition is met, the control means being further operable to cause an intermediate regeneration of the air dryer in advance of said predetermined system condition being met.

In such an embodiment the control means includes a governor adapted to cause a standard regeneration and a governor bypass arrangement, adapted to cause an intermediate regeneration. The predetermined system condition is preferably a elevated reservoir pressure of the first reservoir.

The governor bypass arrangement preferably includes a delay means, for example a electronic timer, adapted to activate in response to a predetermined system parameter and cause an intermediate regeneration after a predetermined time period has elapsed. In one embodiment the predetermined system parameter is a reduced reservoir pressure of the second reservoir.

In such an embodiment a pressure sensitive switch is arranged so as to cause operation of the delay means in response to the pressure in the second reservoir dropping blow a predetermined value, for example when a large volume of air is forwarded from the second reservoir. In a preferred embodiment the pressure sensitive switch is adapted to operate a pneumatic signal piston of the delay means. The signal piston is arranged such that pressure from the first reservoir normally maintains the piston in a position whereby the delay means is deactivated. When the pressure switch is operated in response to a reduced pressure in the second reservoir, the pressure applied to the piston is removed, and the piston may be moved so as to activate the delay means. Movement of the piston may be achieved by the provision of a spring acting thereon.

In such an embodiment the pressure switch is arranged to operate a valve provided in a conduit extending between the first reservoir and the signal piston. Preferably the valve is a solenoid operated valve. When the pressure switch is operated the valve is movable from a first position wherein pressure from the first reservoir is communicated to the signal piston, and a second position wherein the conduit is blocked and the piston vented to atmosphere. It will be understood that the valve will revert to the first position when the pressure in the second reservoir rises above said predetermined value.

The delay means is configured cause an intermediate regeneration of the air dryer when a predetermined time period has elapsed. In a preferred embodiment the delay means is configured to send a pressure signal to the air dryer to take the compressor off-load and regenerate the air dryer. In such an embodiment the delay means are arranged so as to operate a valve in a conduit extending between the first reservoir and the air dryer. Preferably the valve is solenoid operated and movable between a first position where the conduit is closed, and a second position where the conduit is open.

In a preferred embodiment a protection valve is provided between the first and second reservoirs. The protection valve is adapted to maintain a predetermined minimum pressure in the first reservoir. The provision of such a protection valve ensures that the first reservoir holds sufficient pressure to operate the signal piston and cause intermediate regeneration of the air dryer.

Figure 2:
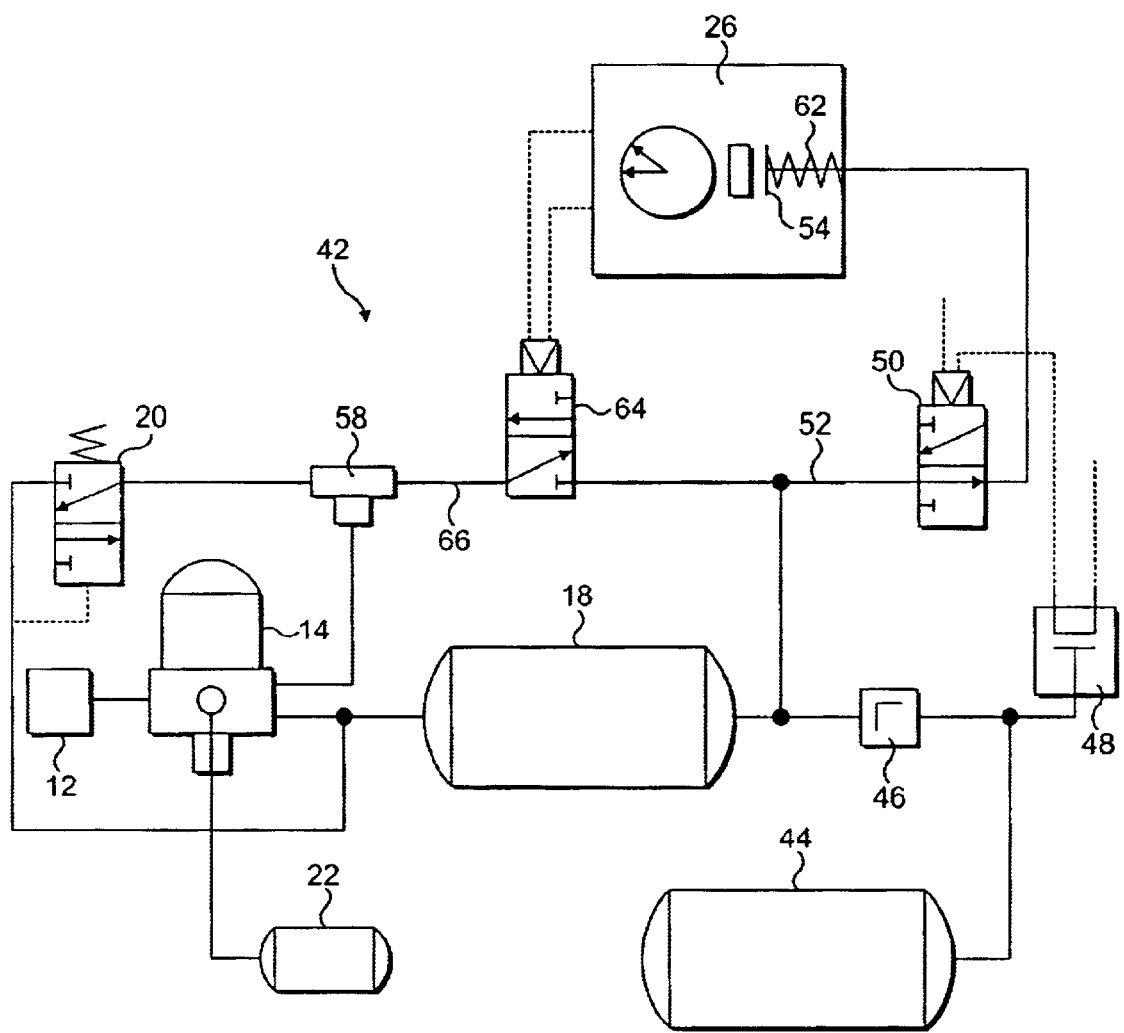

Embodiments of the present invention will now be described with reference to the accompanying drawings, in which:

FIG. 1 shows a schematic representation of a first embodiment of an air supply system according to the present invention; and FIG. 2 shows a schematic representation of a second embodiment of an air supply system according to the present invention.

Referring firstly to FIG. 1 the air supply system, generally designated 10, includes a compressor 12, an air dryer 14, a charging valve 16 and a reservoir 18. The system 10 further includes a governor 20 which is sensitive to the pressure within the reservoir 18 and arranged to take the compressor off load and regenerates the air dryer desiccant when the reservoir 18 reaches a target pressure. Regeneration of the air dryer desiccant is achieved by venting the air dryer 14 to atmosphere and flushing the desiccant with a small amount of dry air contained in a purge tank 22. In FIG. 1 the purge tank 22 is shown separate from the reservoir 18, however it will be understood that the purge tank 22 can be incorporated into the reservoir 18. Finally, the air supply system 10 comprises a purge control valve 24 and a timer 26, the operation of which will be described in greater detail below.

Normal operation of the air supply system 10 is as follows. Moist compressed air from the compressor 12 is passed via conduit 28 to the air dryer 14. The moist air is dried by being passed through a desiccant bed in the air dryer 14 before being supplied to the reservoir 18 via conduit 30 and the charging valve 16, and to the reservoir 22. Pressurised air from the reservoir 18 can then be supplied via outlet conduit 32 and a demand valve (not shown). The reservoir 18 includes a pressure line 34 which is connected to the governor 20. In the embodiment shown the governor 20 includes a pressure sensitive valve 36 which is operable to supply a signal pressure via pressure line 38 from the reservoir 18 to the air dryer 14.

When the governor 20 senses via pressure line 34 that the reservoir 18 has reached a target pressure, the valve 36 moves from the position shown to pressurise line 38. The pressure signal received by the air dryer 14 takes the compressor 12 off load, opens a vent of the air dryer 14 to atmosphere and purges the desiccant with dry air from the purge tank 22. When the reservoir pressure falls below a predetermined pressure, for example when air is supplied from the reservoir 18, the valve 36 reverts to the position shown in the figure and the pressure signal to the air dryer 14 is cut off. The air dryer vent closes and the compressor 12 is brought on line to replenish the reservoirs 18, 22.

The rating of the compressor 12 and air dryer 14, and the volume of the reservoir 18 are such that, during normal operation as described above, regeneration of the desiccant takes place well before saturation is reached. However in circumstances where the compressor 12 is required to supply volumes of air in excess of those normally required to replenish the reservoir 18, intermediate regeneration of the desiccant, i.e. before the reservoir target pressure is reached, is necessary to prevent saturation of the desiccant.

This intermediate regeneration is achieved by the provision of the timer 26 and purge control valve 24. The timer 26 is sensitive to the pressure in the reservoir 18 and when the reservoir pressure drops below a predetermined value the timer 26 is activated. After a predetermined time interval the timer 26 operates the purge control valve 24 via a solenoid and causes it to move from the position shown in FIG. 1. It will be understood that the elapsed time of the timer 26 is calculated to be less that the time needed to fully saturate the desiccant. This has the effect of pressurising line 38 via a governor bypass line 40 and pressure line 34. The pressure signal received by the air dyer 14 has the effect of taking the compressor 12 off load and purging the desiccant. When the purging operation has taken place, typically a few seconds, the valve 24 reverts to its initial position and the timer 26 is reset. The loss of pressure in line 38 brings the compressor 12 on load and the supply of pressurised air to the reservoir 18 resumed.

During normal operating conditions, the desiccant is regenerated by the governor 20 well in advance of the time interval required for the timer 26 to operate the purge control valve 24. In such circumstances, when the receiver 18 reaches the target pressure and/or the governor 18 operates, the timer is suspended or reset in advance of the next drop in reservoir pressure. It will be understood that the timer governed purge cycle will repeat until the timer is suspended or reset.

A second embodiment of the present invention, generally designated 42, is shown in FIG. 2 where system components common to that of the first embodiment described above are identified with like reference numerals. As before the system 42 comprises a compressor 12 which is adapted to supply compressed air via an air dryer 14 to first and second reservoirs 18, 44. A governor 20 sensitive to the pressure in the first reservoir 18 is arranged to take the compressor 12 off-load and regenerate the air dryer 14 when the first reservoir 18 reaches a target pressure, for example 10 bar. When the first reservoir 18 reaches the target pressure, the governor 20 operates to send a pressure signal from the first reservoir 18 to the air dryer 14 via a double check valve 58. Regeneration of the of the air dryer 14 is achieved by venting the air dryer 14 to atmosphere and flushing the desiccant contained therein with dry air stored in a purge tank 22. As before, the purge tank 22 may be separate from the reservoirs 18, 44 as shown in FIG. 2, or alternatively incorporated in a reservoir 18, 44.

The reservoirs 18, 44 are arranged in series such that dried air from the compressor 12 is supplied consecutively to the first reservoir 18 and then to the second reservoir 44. Interspersed between the reservoirs 18, 44 is a protection valve 46 arranged to maintain a predetermined pressure in the first reservoir 18 irrespective of the pressure in the second reservoir 44. In one practical embodiment, the protection valve 46 may be set to maintain a pressure in the first reservoir 18 of at least 6 bar. It will be understood that the first and second reservoirs 18, 44 may be defined by separate vessels as indicated by FIG. 2, or alternatively may be defined by compartments of a common vessel.

Arranged downstream of the protection valve 46 is a pressure switch 48 sensitive to the pressure of the second reservoir 44. The switch 48 is arranged to operate a first solenoid 50 when the pressure in the second reservoir drops below a predetermined value, for example 6 bar. This solenoid 50 is arranged in a pressure line 52 extending between the first reservoir 18 and a signal piston 54 of a timer unit 26. During normal operation the solenoid 50 is maintained in the position shown in FIG. 2 with pressure from the first reservoir 18 acting on the signal piston 54 via the line 52. With pressure acting on the signal piston 54 the timer unit 26 is disabled. When the pressure in the second reservoir 44 drops below the predetermined value, the pressure switch 48 is operated and causes movement of the first solenoid 50. This movement blocks the line 52 extending from the first reservoir 18 to the signal piston 54 and vents the signal piston 54 to atmosphere. A spring 62 of the signal piston 54 causes movement thereof and activates the timer unit 26.

The timer unit 26 is arranged to periodically operate a second solenoid valve 64 arranged between the first reservoir 18 and the double check valve 58. The second solenoid 64 is normally positioned as shown in FIG. 2 whereby a pressure line 66 between the first reservoir 18 and the double check valve 58 is blocked. After a predetermined time period has elapsed, the timer unit 26 causes the second solenoid 64 to move to a position whereby the pressure line 66 is unblocked and pressure is applied to the air dryer 14 via the double check valve 58. As described above, the application of pressure to the air dryer 14 causes the compressor 12 to be taken off load and the air dryer 14 to be regenerated. Once regeneration of the air dryer 14 has taken place, the second solenoid 64 resets to its original position and the compressor 12 is brought on-load to recommence the supply of air to the reservoirs 18,44.

As before, it will be understood that periodic regeneration of the air dryer 14 under the control of the timer unit 26 can continue until the second reservoir 44 reaches a pressure sufficient to deactivate the pressure switch 48 and re-pressurise the signal piston 54 thereby suspending the timer unit 26. The provision of two reservoirs 18, 44 separated by a protection valve 46 ensures that there exists at all times sufficient system pressure to operate the signal piston 54 via the first solenoid 50 and cause regeneration of the air dryer 14 via the second solenoid 64.

In the embodiments shown the timer 26 is sensitive to and operated, either directly or indirectly, by a reservoir pressure. It will be understood that the timer 26 may be sensitive to other system parameters. For example the timer 26 may be activated when the compressor comes on load and be suspended/reset when the compressor comes off load.

What is claimed is:

1. A vehicle air supply system having a compressor, an air dryer, a reservoir adapted to receive air from the compressor via the air dryer, and control means operable to cause a standard regeneration of the air dryer when a predetermined elevated reservoir pressure is reached, the control means being further operable to cause an intermediate regeneration of the air dryer in advance of said predetermined elevated reservoir pressure being reached, the control means including a governor which is adapted to cause a standard regeneration and a governor bypass adapted to cause an intermediate regeneration.

2. An air supply system as claimed in claim 1 wherein the governor bypass includes a delay means adapted to activate in response to a predetermined system parameter and cause an intermediate regeneration after a predetermined time period has elapsed.

3. An air supply system as claimed in claim 2 wherein the predetermined system parameter is a reduced reservoir pressure.

4. An air supply system as claimed in claim 2 wherein the predetermined system parameter is an operating condition of the compressor.

5. An air supply system as claimed in claim 1 wherein delay means is adapted to be reset after regeneration of the air dryer.

6. An air supply system as claimed in claim 1, the system having a first reservoir adapted to receive air from the compressor via the air dryer, and a second reservoir adapted to receive air from the first reservoir, the control means being operable to cause a standard regeneration when a predetermined elevated reservoir pressure of the first reservoir is reached.

7. An air supply system as claimed in claim 6 wherein the governor bypass arrangement includes a delay means adapted to activate in response to a predetermined system parameter and cause an intermediate regeneration after a predetermined time period has elapsed.

8. An air supply system as claimed in claim 7 wherein the predetermined system parameter is a reduced reservoir pressure of the second reservoir.

9. An air supply system as claimed in claim 7 wherein the predetermined system parameter is an operating condition of the compressor.

10. An air supply system as claimed in claim 8 and including a pressure sensitive switch is arranged so as to cause operation of the delay means in response to the pressure in the second reservoir dropping below a predetermined value.

11. An air supply system as claimed in claim 10 the pressure sensitive switch is adapted to operate a pneumatic signal piston of the delay means.

12. An air supply system as claimed in claim 11 wherein said signal piston is arranged such that pressure from the first reservoir normally maintains the piston in a position whereby the delay means is deactivated.

13. An air supply system as claimed in claim 12 wherein the pressure switch is arranged to operate a valve provided in a conduit extending between the first reservoir and the signal piston.

14. An air supply system as claimed in claim 13 wherein the valve is a solenoid operated valve.

15. An air supply system as claimed in claim 13 wherein the valve is movable from a first position wherein pressure from the first reservoir is communicated to the signal piston, and a second position wherein the conduit is blocked and the piston vented to atmosphere.

16. An air supply system as claimed in claim 7 wherein the delay means is configured to send a pressure signal to the air dryer to take the compressor off-load and regenerate the air dryer.

17. An air supply system as claimed in claim 16 wherein the delay means are arranged so as to operate a valve in a conduit extending between the first reservoir and the air dryer.

18. An air supply system as claimed in claim 17 wherein the valve is a solenoid valve.

19. An air supply system as claimed in claim 17 wherein the valve is movable between a first position where the conduit is closed, and a second position where the conduit is open.

20. An air supply system as claimed in claim 6 wherein a protection valve is provided between the first and second reservoirs, the protection valve being adapted to maintain a predetermined minimum pressure in the first reservoir.

* * * * *